United States Patent [19]

Fortescue

[11] 4,000,617
[45] Jan. 4, 1977

[54] CLOSED CYCLE GAS TURBINE SYSTEM

[75] Inventor: Peter Fortescue, La Jolla, Calif.

[73] Assignee: General Atomic Company, San Diego, Calif.

[22] Filed: Jan. 27, 1975

[21] Appl. No.: 544,130

[52] U.S. Cl. .................................. 60/644; 60/682; 60/690; 60/652

[51] Int. Cl.² ..................... F01K 25/10; F02C 7/12; F02C 9/00

[58] Field of Search ............ 60/644, 652, 650, 682, 60/686, 690, 524

[56] References Cited
UNITED STATES PATENTS

| | | | |
|---|---|---|---|
| 3,220,191 | 11/1965 | Berchtold | 60/682 |
| 3,377,800 | 4/1968 | Spillmann | 60/644 |
| 3,512,358 | 5/1970 | Schmidt | 60/644 X |
| 3,699,681 | 10/1972 | Frutschi | 60/682 |
| 3,867,811 | 2/1975 | Waeselynck | 60/652 |

*Primary Examiner*—Allen M. Ostrager
*Attorney, Agent, or Firm*—Fitch, Even, Tabin & Luedeka

[57] ABSTRACT

A closed cycle gas turbine system is described employing a precooler for cooling the gas prior to compression. A closed loop coolant circuit for the precooler employs a heat exchanger. A storage tank is provided for storing a supply of coolant at a temperature substantially lower than the temperature of coolant in the coolant circuit at the discharge side of the heat exchanger. Means selectively circulate the coolant in the storage tank through the precooler to provide a power increase, when needed, in the gas turbine system.

10 Claims, 1 Drawing Figure

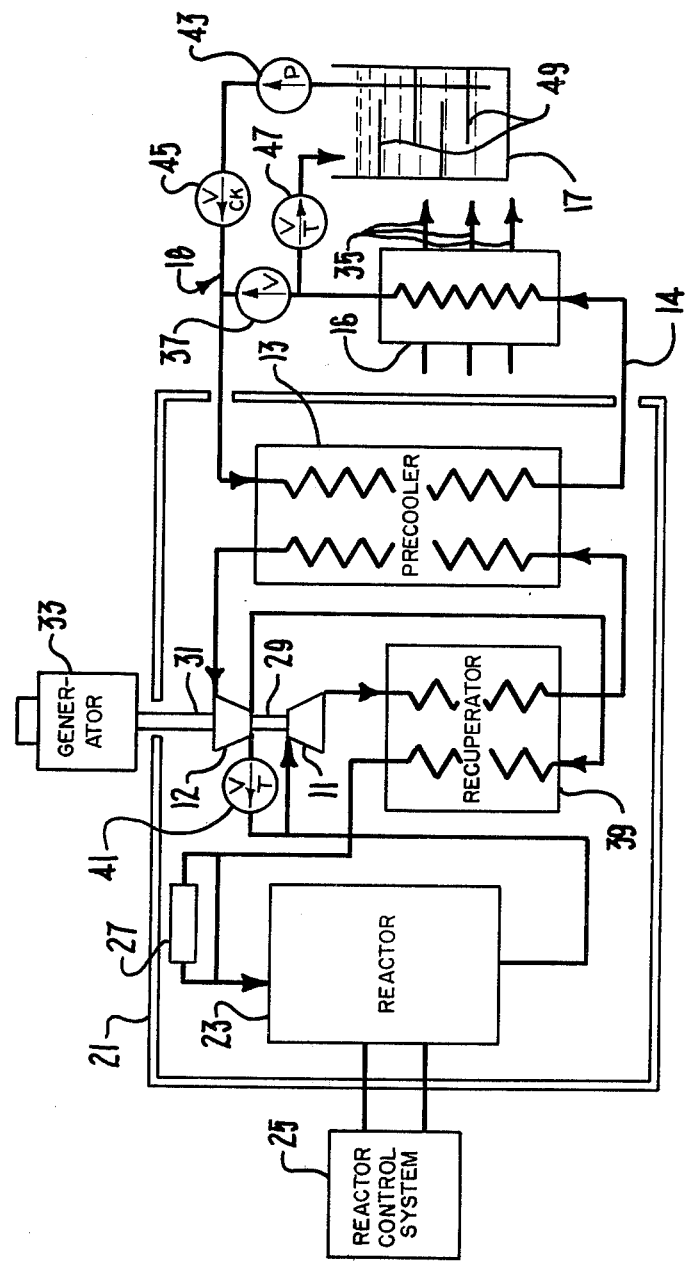

CLOSED CYCLE GAS TURBINE SYSTEM

This invention relates generally to closed cycle gas turbine systems and, more particularly, to an improved closed cycle gas turbine system which finds particular advantage in a gas-cooled nuclear reactor system for producing electrical power.

High temperature gas-cooled nuclear reactors offer significant advantages over other types of nuclear reactors for electrical power production. Such reactors typically employ a compressible gas which is circulated over the reactor core to cool the core. Heat from the gas is then removed for the purpose of generating electrical power. The heat may be removed through the utilization of boilers wherein a steam cycle is used to operate electrical generating apparatus. The utilization of the coolant gas directly in a closed cycle gas turbine system, however, may offer significant advantages.

More particularly, the use of the coolant gas in a high temperature gas-cooled reactor for direct closed cycle gas turbine system operation affords high efficiency and is adaptable to dry air cooling. The latter factor minimizes environmental impact, since large make-up water requirements or the discharge of large quantities of warm water are avoided. Moreover, the elimination of the need for large quantities of water provides for greater flexibility in the selection of plant site.

In operating an electrical power generating system, certain changes may occur, either long term or short term, in the electrical load requirements. In a steam driven generating system such changes are easily followed because the ability to condense and throttle the steam enables rapid power changes in either direction. The gas turbine system, on the other hand, does not readily lend itself to analogous means of control. Load control in a closed cycle gas turbine system may be accomplished by bleeding off a portion of the total inventory of the gas, thus reducing overall system pressure. However, although this technique provides very high operating efficiency, it is a relatively slow process and therefore does not suit itself to the following of rapid load changes.

A more rapid response to load changes may be achieved, in a closed cycle gas turbine system, by other means. The temperature of the gas as it enters the turbine may be controlled. In a nuclear reactor system, this is typically done by controlling the reactor core temperature to regulate the temperature of the gas as it exits the reactor core. Another technique for power control, which offers even more rapid response, is the use of a bypass system which bypasses a portion of the gas directly from the compressor to the turbine. This bypasses the reactor core completely but is capable of providing rapid temporary power changes. Nevertheless, this latter technique is typically inefficient and therefore is often uneconomical.

It is an object of the present invention to provide a closed cycle gas turbine system having provision for following variations in load relatively quickly.

Another object of the invention is to provide a gas-cooled nuclear reactor system employing a closed cycle gas turbine system and in which improved provision is made for load following capability.

A more general object of the invention is to provide an improved closed cycle gas turbine system which is particularly adapted for use in a gas-cooled nuclear reactor system.

Other objects of the invention will become apparent to those skilled in the art from the following description, taken in connection with the accompanying drawing wherein the sole FIGURE is a schematic diagram of a nuclear reactor system employing a closed cycle gas turbine system constructed in accordance with the invention.

Very generally, the gas turbine system of the invention employs turbine means 11 and compressor means 12. A gas is circulated for expansion in the turbine means and compression in the compressor means. A precooler 13 cools the gas prior to compression in the compressor means. A closed loop coolant circuit 14 circulates a coolant through the precooler. The coolant circuit includes a heat exchanger 16 for cooling the coolant therein. A storage tank 17 is employed for a supply of coolant at a temperature substantially lower than the temperature of coolant in the coolant circuit at the discharge side of the heat exchanger. Means 18 are provided for selectively circulating the coolant in the storage tank through the precooler to provide a power increase in the gas turbine system.

Referring now more particularly to the drawing, the closed cycle gas turbine system illustrated therein is employed in a nuclear reactor system of the high temperature gas-cooled type. High temperature gas-cooled reactors are well known in the art and will not be described in particular detail herein. The reactor system of the illustrated embodiment includes a prestressed concrete reactor vessel 21 which encloses the reactor 23 and its associated structures and ducting, not shown, and in which the entire primary coolant system and closed cycle gas turbine system of the invention are also enclosed.

The reactor itself may be of any suitable type and is controlled by a suitable reactor control system 25 from outside of the prestressed concrete reactor vessel 21. In the illustrated embodiment, the primary reactor coolant is helium and in a system wherein the reactor is of approximately 3,000 megawatts thermal capacity, it can be expected that the inlet temperature of the helium is approximately 927° F and that the outlet temperature of the helium is approximately 1500° F. A coolant gas inventory control system 27 is provided through which some of the coolant gas may be bled off or bled in to thus regulate the total inventory of coolant gas in the reactor system. This also regulates the overall operating pressures within the closed cycle gas turbine system.

The closed cycle gas turbine system includes the turbine 11 and the compressor 12, each of which may be a single stage or multiple stage as desired. A shaft connection 29 or other suitable mechanical drive means couples the turbine 11 to the compressor 12. Similarly, a shaft connection 31, having suitable seals, not shown, passes out of the reactor vessel 21 to a generator 33 for producing electrical power.

The precooler 13 is used as known in the art for cooling the gas prior to compression in order to reduce the amount of work necessary to compress the gas. A closed loop coolant circuit 14 is employed for the precooler 13 which circulates coolant from outside the reactor core through the precooler 13. The heat exchanger 16, which preferably is a dry-cooling tower, is connected in series in the coolant circuit and cools the water flowing in the coolant circuit by the flow of air, indicated by the arrows 35. Preferably, the coolant circuit is pressurized to permit the water therein to be heated above the boiling point. Typical operating temperatures may be an inlet temperature to the heat exchanger 16 of 280° F and an outlet temperature from the heat exchanger 16 of about 85° F. Water flowing in the closed loop coolant circuit 14 is returned to the precooler from the heat exchanger 16 through a valve 37.

The turbine 11 provides all the necessary power to drive the compressor 12 and also drives the electrical generator 33. As the working gas leaves the turbine 11, all useful work has been extracted insofar as expansion is concerned. Nevertheless, the gas exiting the turbine 11 still has a substantial amount of thermal energy. This thermal energy is transferred to the compressed gas prior to its circulation through the reactor 23 by the use of a recuperator 39. Typical temperatures of gas exiting the turbine 11 are about 990° F. In a suitably constructed recuperator, the temperature of the gas prior to entry into the precooler 13 may be dropped to about 441° F and in doing so, the temperature of the compressed gas exiting the compressor 12 may be raised from about 350° F to about 927° F.

In operating the illustrated system, gas passes through the reactor 23 and enters the turbine 11 for expansion. After expansion, some of the heat from the gas is extracted as it passes through the recuperator 39 and enters the precooler 13. In the precooler 13, the gas is cooled down for compression in the compressor 12. After compression in the compressor 12, the gas is circulated back through the recuperator to increase its temperature and then passes down through the reactor 23 once more.

As previously mentioned, changes in the load may be accommodated by the system in several different ways. Typically, the most efficient control is through the use of varying the coolant-gas inventory by means of the storage system and bleed-off system 27. Ideally, removing helium from the system should act only to reduce helium densities and pressures, by leaving the system temperatures unchanged. As a practical matter, however, this ideal situation does not occur. This is because the precooler outlet temperature drops as the system's power levels drop, because the rejected heat load also decreases. Also, as the temperatures and pressures in the helium are decreased, the redistribution of pressure losses around the various coolant loops creates some small mismatch between the turbine and compressor operating points. In spite of this, however, plant efficiency decreases very little even at an operating steady state level of only 25% of design output. Because inventory control is a slow process, however, this mode of control is not well suited to following rapid changes in load demand.

The other mode of control employed by the illustrated system is in controlling the outlet temperature of the reactor 23 by suitably controlling the reactor through the reactor control system 25. As the temperature of the helium exiting the reactor 23 decreases, temperatures and pressures throughout the system decrease. A further form of control employed in the illustrated system is in the use of a bypass control. To this end a throttle valve 41 is employed which bypasses a variable amount of gas from the outlet of the compressor 12 to the inlet of the turbine 11. This is a relatively rapid form of control and may be used to accomplish a 10% step load change in approximately one second. This control also provides for accommodating small load perturbations. This control, however, is of very low efficiency and therefore its application for extended time periods is undesirable. As an alternative, the bypass control may direct some of the outlet gas from the compressor 12 to the inlet of the precooler 13.

In accordance with the invention, a method of satisfying rapid load increase demands is accomplished by the provision for rapidly reducing the temperature of the water circulating in the precooler 13. To this end, a storage tank 17 is provided in which a volume of water is maintained sufficient to provide the lower temperature cooling water flow for the desired period of time. A pump 43 provides water from the bottom of the tank 17 through a check valve 45 to the inlet side of the precooler 13. Water flowing in the circuit 15 passes through the dry cooling tower of heat exchanger 16 and, assuming the valve 37 is closed, is discharged into the tank 17 through the throttle valve 47. Baffles 49 provided within the tank 17 prevent thermal mixing of the water in the tank to insure that the full supply of cold water in the tank is used.

Assuming a 1,000 megawatt electrical power station, a tank approximately 115 feet square and 20 feet deep, holding water at a temperature of 55° F, will provide a 10% power boost for a one-hour period where the nominal inlet water temperature to the precooler 13 is 85° F. This would allow time for such other adjustments to the system as gas inventory control or reactor outlet temperature control to take over and accommodate the changed load. During normal operation, of course, the valve 37 is open and the valve 47 is completely closed so the water in the tank 17 is not used in the system. Given a sufficiently large capacity for the tank 17, the system is also capable of meeting longer term excess power demands such as might occur during periods of very high ambient air temperature and high loads. If cooler water from night-time operation is used to fill the tank 17, the need for artifical refrigeration may be minimized or eliminated.

It may be seen, therefore, that the invention provides an improved closed cycle gas turbine system which is particularly adapted for use in a high temperature gas-cooled nuclear reactor system. The invention enables the gas turbine system to more readily follow load changes while maintaining relatively high operating efficiency.

Various modifications of the invention in addition to those shown and described herein will become apparent to those skilled in the art from the foregoing description and accompanying drawing. Such modifications are intended to fall within the scope of the appended claims.

What is claimed is:

1. A closed cycle gas turbine system comprising, turbine means, compressor means, means for circulating a gas for expansion in said turbine means and compression in said compressor means, a precooler for cooling the gas prior to compression in said compressor means, a closed loop coolant circuit for circulating a coolant through said precooler, said coolant circuit including a heat exchanger for cooling the coolant therein, a storage tank for storing a supply of coolant at a temperature substantially lower than the temperature of coolant in said coolant circuit at the discharge side of said heat exchanger, and means for selectively circulating the coolant in said storage tank through said precooler to provide a power increase in said gas turbine system.

2. A system according to claim 1 wherein said selective circulating means comprise a valve series connected in said closed loop coolant circuit, and means for coupling said storage tank in parallel with said valve when said valve is closed.

3. A system according to claim 2 wherein said valve is connected between said heat exchanger and said precooler, and wherein said coupling means couple the discharge side of said heat exchanger to said storage tank.

4. A system according to claim 1 wherein said heat exchanger comprises a dry cooling tower.

5. In a gas-cooled nuclear reactor system for producing electrical power and including means for controlling the gas temperature at the outlet of the reactor core, a closed cycle gas turbine system comprising, turbine means, compressor means, means for circulating the reactor coolant gas for expansion in said turbine means and compression in said compressor means, a precooler for cooling the gas prior to compression in said compressor means, a closed loop coolant circuit for circulating a coolant through said precooler, said coolant circuit including a heat exchanger for cooling the coolant therein, a storage tank for storing a supply of coolant at a temperature substantially lower than the temperature of coolant in said coolant circuit at the discharge side of said heat exchanger, and means for selectively circulating the coolant in said storge tank through said precooler to provide a power increase in said gas turbine system.

6. A system according to claim 5 including bypass means for bypassing a portion of the gas directly from the outlet of said compressor means to the inlet of said turbine means.

7. A system according to claim 5 wherein said selective circulating means comprise a valve series connected in said closed loop coolant circuit, and means for coupling said storage tank in parallel with said valve when said valve is closed.

8. A system according to claim 5 wherein said valve is connected between said heat exchanger and said precooler, and wherein said coupling means couple the discharge side of said heat exchanger to said storage tank.

9. A system according to claim 5 wherein said heat exchanger comprises a dry cooling tower.

10. A system according to claim 5 including a recuperator for heating the gas after compression by said compressor means.

* * * * *